US012739002B2

(12) United States Patent
Zhou et al.

(10) Patent No.: US 12,739,002 B2
(45) Date of Patent: Sep. 15, 2026

(54) SUBBAND BEAM REPORTING

(71) Applicant: QUALCOMM Incorporated, San Diego, CA (US)

(72) Inventors: Yan Zhou, San Diego, CA (US); Hamed Pezeshki, San Diego, CA (US); Konstantinos Dimou, New York, NY (US); Tao Luo, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 374 days.

(21) Appl. No.: 18/002,389

(22) PCT Filed: Sep. 1, 2021

(86) PCT No.: PCT/US2021/071340
§ 371 (c)(1),
(2) Date: Dec. 19, 2022

(87) PCT Pub. No.: WO2022/051756
PCT Pub. Date: Mar. 10, 2022

(65) Prior Publication Data

US 2023/0231607 A1 Jul. 20, 2023

(30) Foreign Application Priority Data

Sep. 4, 2020 (GR) .............................. 20200100538

(51) Int. Cl.
*H04B 7/06* (2006.01)
*H04L 5/00* (2006.01)

(52) U.S. Cl.
CPC ......... *H04B 7/0626* (2013.01); *H04L 5/0051* (2013.01); *H04L 5/0094* (2013.01)

(58) Field of Classification Search
None
See application file for complete search history.

(56) References Cited

U.S. PATENT DOCUMENTS

2012/0020230 A1* 1/2012 Chen .................... H04L 1/0028 370/252
2013/0083753 A1* 4/2013 Lee ...................... H04L 1/0026 370/329

(Continued)

FOREIGN PATENT DOCUMENTS

WO 2020034100 A1 2/2020
WO 2020155016 8/2020

OTHER PUBLICATIONS

International Search Report and Written Opinion—PCT/US2021/071340—ISA/EPO—Dec. 14, 2021.

(Continued)

*Primary Examiner* — Otis L Thompson, Jr.
(74) *Attorney, Agent, or Firm* — QUALCOMM Incorporated

(57) ABSTRACT

Various aspects of the present disclosure generally relate to wireless communication. In some aspects, a user equipment (UE) may receive configuration information for a beam report, wherein the configuration information indicates whether the beam report is associated with at least one of a subband granularity or a wideband granularity, wherein the beam report is for a reference signal received power (RSRP) measurement or a signal to interference plus noise ratio (SINR) measurement, and wherein the beam report is based at least in part on a channel state information reference signal (CSI-RS) or a synchronization signal block (SSB). The UE may determine the beam report based at least in part on the configuration information. The UE may transmit the beam report. Numerous other aspects are provided.

30 Claims, 8 Drawing Sheets

(56) References Cited

U.S. PATENT DOCUMENTS

| | | | | |
|---|---|---|---|---|
| 2013/0301560 | A1* | 11/2013 | Geirhofer | H04B 7/0621 370/329 |
| 2013/0336214 | A1* | 12/2013 | Sayana | H04W 72/542 370/328 |
| 2015/0016288 | A1* | 1/2015 | Maattanen | H04L 1/003 370/252 |
| 2017/0141833 | A1* | 5/2017 | Kim | H04W 24/08 |
| 2017/0202014 | A1* | 7/2017 | Moon | H04B 7/0626 |
| 2018/0167116 | A1* | 6/2018 | Rahman | H04B 7/0478 |
| 2019/0239216 | A1* | 8/2019 | Kundu | H04W 72/21 |
| 2020/0068426 | A1* | 2/2020 | Han | H04L 1/06 |
| 2020/0170027 | A1* | 5/2020 | Yang | H04W 56/001 |
| 2020/0177252 | A1 | 6/2020 | Park et al. | |
| 2020/0228182 | A1* | 7/2020 | Nilsson | H04B 7/0647 |
| 2020/0235797 | A1* | 7/2020 | Kim | H04B 7/0626 |
| 2020/0245178 | A1* | 7/2020 | Liang | H04W 24/08 |
| 2021/0028843 | A1* | 1/2021 | Zhou | H04L 5/0053 |
| 2021/0175950 | A1* | 6/2021 | Sergeev | H04B 7/0634 |
| 2021/0184824 | A1* | 6/2021 | Kwak | H04L 5/0094 |
| 2021/0211225 | A1* | 7/2021 | Yuan | H04L 5/0057 |
| 2021/0328646 | A1* | 10/2021 | Wu | H04B 7/0478 |
| 2021/0351881 | A1* | 11/2021 | Park | H04W 72/04 |
| 2022/0182123 | A1* | 6/2022 | Hao | H04B 7/0486 |
| 2022/0256387 | A1* | 8/2022 | Xiao | H04L 5/0035 |
| 2023/0217265 | A1* | 7/2023 | Huang | H04W 24/10 370/329 |

OTHER PUBLICATIONS

Kaikkonen J., et al., “Main Radio Interface Related System Procedures,” Apr. 24, 2020 (Apr. 24, 2020), XP055845846, 136 Pages, Retrieved from the Internet: URL:https://onlinelibrary.wiley.com/doi/pdfdirect/10.1002/9781119582335.ch4 [retrieved on Sep. 29, 2021], Section 4.4, p. 1-p. I, Sections 4.2.4.3, 4.3.2.8.7, 4.3.2.9, 4.3.3.2.3, 4.3.5, and 4.5.1, Figures 4.58-4.59, Table 4.16, p. 302-p. 303, p. 328, p. 342-p. 344.

ZTE: “Feature Lead Summary on CSI Measurement”, 3GPP Draft, 3GPP TSG-RAN WG1 Meeting #94bis, R1-1811858 Feature Lead Summary on CSI Measurement, 3rd Generation Partnership Project (3GPP), Mobile Competence Centre, 650, Route Des Lucioles, F-06921 Sophia-Antipolis Cedex, France, vol. RAN WG1, No. Chengdu, China, Oct. 8, 2018-Oct. 12, 2018 Oct. 9, 2018 (Oct. 9, 2018), XP051519182, 15 Pages, Section 2.

* cited by examiner

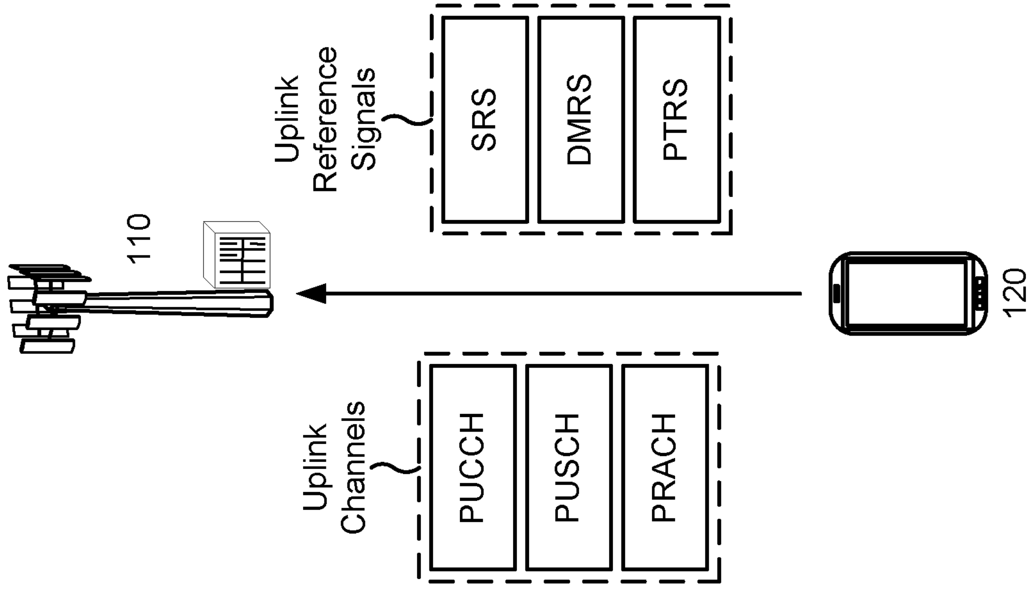
FIG. 3
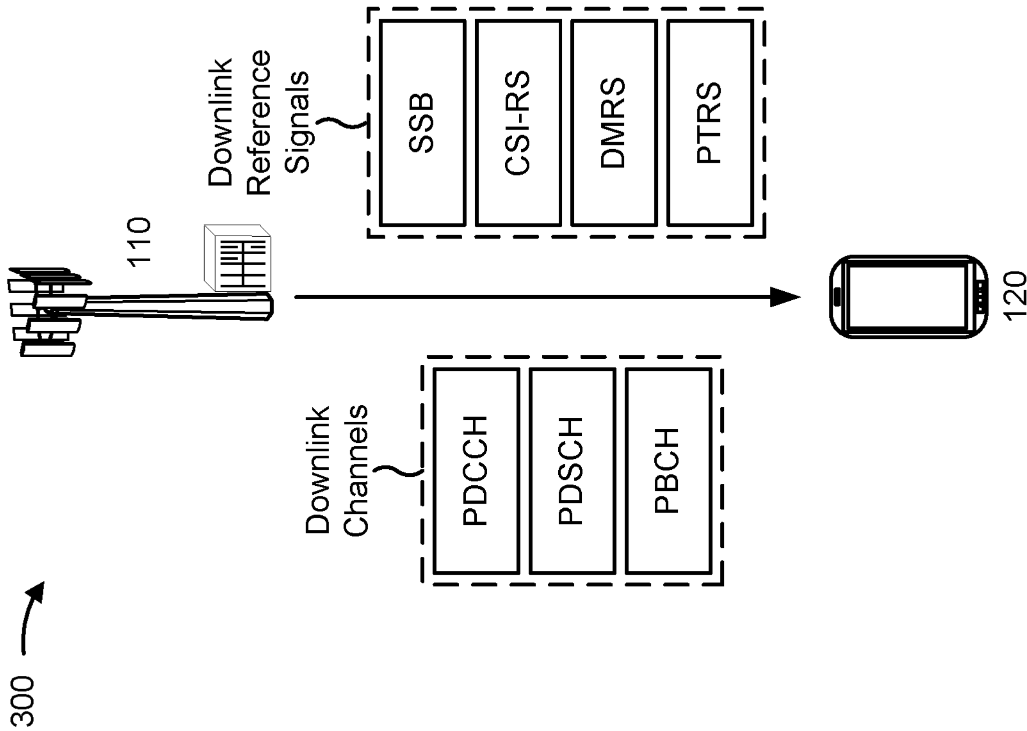

SUBBAND BEAM REPORTING

CROSS-REFERENCE TO RELATED APPLICATIONS

This Patent Application is a 371 national stage of PCT Application No. PCT/US2021/071340 filed on Sep. 1, 2021, entitled "SUBBAND BEAM REPORTING," which claims priority to Greece Patent Application Serial No. 20200100538, filed on Sep. 4, 2020, entitled "SUBBAND BEAM REPORTING." The disclosure of the prior Applications are considered part of and are hereby expressly incorporated by reference into this Patent Application.

FIELD OF THE DISCLOSURE

Aspects of the present disclosure generally relate to wireless communication and to techniques and apparatuses for subband beam reporting.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes receiving configuration information for a beam report, wherein the configuration information indicates whether the beam report is associated with at least one of a subband granularity or a wideband granularity, wherein the beam report is for a reference signal received power (RSRP) measurement or a signal to interference plus noise ratio (SINR) measurement, and wherein the beam report is based at least in part on a channel state information reference signal (CSI-RS) or a synchronization signal block (SSB); determining the beam report based at least in part on the configuration information; and transmitting the beam report.

In some aspects, a method of wireless communication performed by a base station includes transmitting, to a UE, configuration information for a beam report, wherein the configuration information indicates whether the beam report is associated with at least one of a subband granularity or a wideband granularity, wherein the beam report is for an RSRP measurement or an SINR measurement, and wherein the beam report is based at least in part on a CSI-RS or an SSB; and receiving the beam report based at least in part on the configuration information.

In some aspects, a UE for wireless communication includes a memory and one or more processors coupled to the memory, the memory and the one or more processors configured to: receive configuration information for a beam report, wherein the configuration information indicates whether the beam report is associated with at least one of a subband granularity or a wideband granularity, wherein the beam report is for an RSRP measurement or an SINR measurement, and wherein the beam report is based at least in part on a CSI-RS or an SSB; determine the beam report based at least in part on the configuration information; and transmit the beam report.

In some aspects, a base station for wireless communication includes a memory and one or more processors coupled to the memory, the memory and the one or more processors configured to: transmit, to a UE, configuration information for a beam report, wherein the configuration information indicates whether the beam report is associated with at least one of a subband granularity or a wideband granularity, wherein the beam report is for an RSRP measurement or an SINR measurement, and wherein the beam report is based at least in part on a CSI-RS or an SSB; and receive the beam report based at least in part on the configuration information.

In some aspects, a non-transitory computer-readable medium storing a set of instructions for wireless communication includes one or more instructions that, when executed by one or more processors of a UE, cause the UE to: receive configuration information for a beam report, wherein the configuration information indicates whether the beam report is associated with at least one of a subband granularity or a wideband granularity, wherein the beam report is for an RSRP measurement or an SINR measurement, and wherein the beam report is based at least in part on a CSI-RS or an SSB; determine the beam report based at least in part on the configuration information; and transmit the beam report.

In some aspects, a non-transitory computer-readable medium storing a set of instructions for wireless communication includes one or more instructions that, when executed by one or more processors of a base station, cause the base station to: transmit, to a UE, configuration information for a beam report, wherein the configuration information indicates whether the beam report is associated with at least one of a subband granularity or a wideband granularity, wherein the beam report is for an RSRP measurement or an SINR measurement, and wherein the beam report is based at least in part on a CSI-RS or an SSB; and receive the beam report based at least in part on the configuration information.

In some aspects, an apparatus for wireless communication includes means for receiving configuration information for a beam report, wherein the configuration information indicates whether the beam report is associated with at least one of a subband granularity or a wideband granularity, wherein the beam report is for an RSRP measurement or an SINR measurement, and wherein the beam report is based at least in part on a CSI-RS or an SSB; means for determining the beam report based at least in part on the configuration information; and means for transmitting the beam report.

In some aspects, an apparatus for wireless communication includes means for transmitting, to a UE, configuration information for a beam report, wherein the configuration information indicates whether the beam report is associated with at least one of a subband granularity or a wideband granularity, wherein the beam report is for an RSRP measurement or an SINR measurement, and wherein the beam report is based at least in part on a CSI-RS or an SSB; and means for receiving the beam report based at least in part on the configuration information.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency chains, power amplifiers, modulators, buffers, processors, interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 3 is a diagram illustrating an example of physical channels and reference signals in a wireless network, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
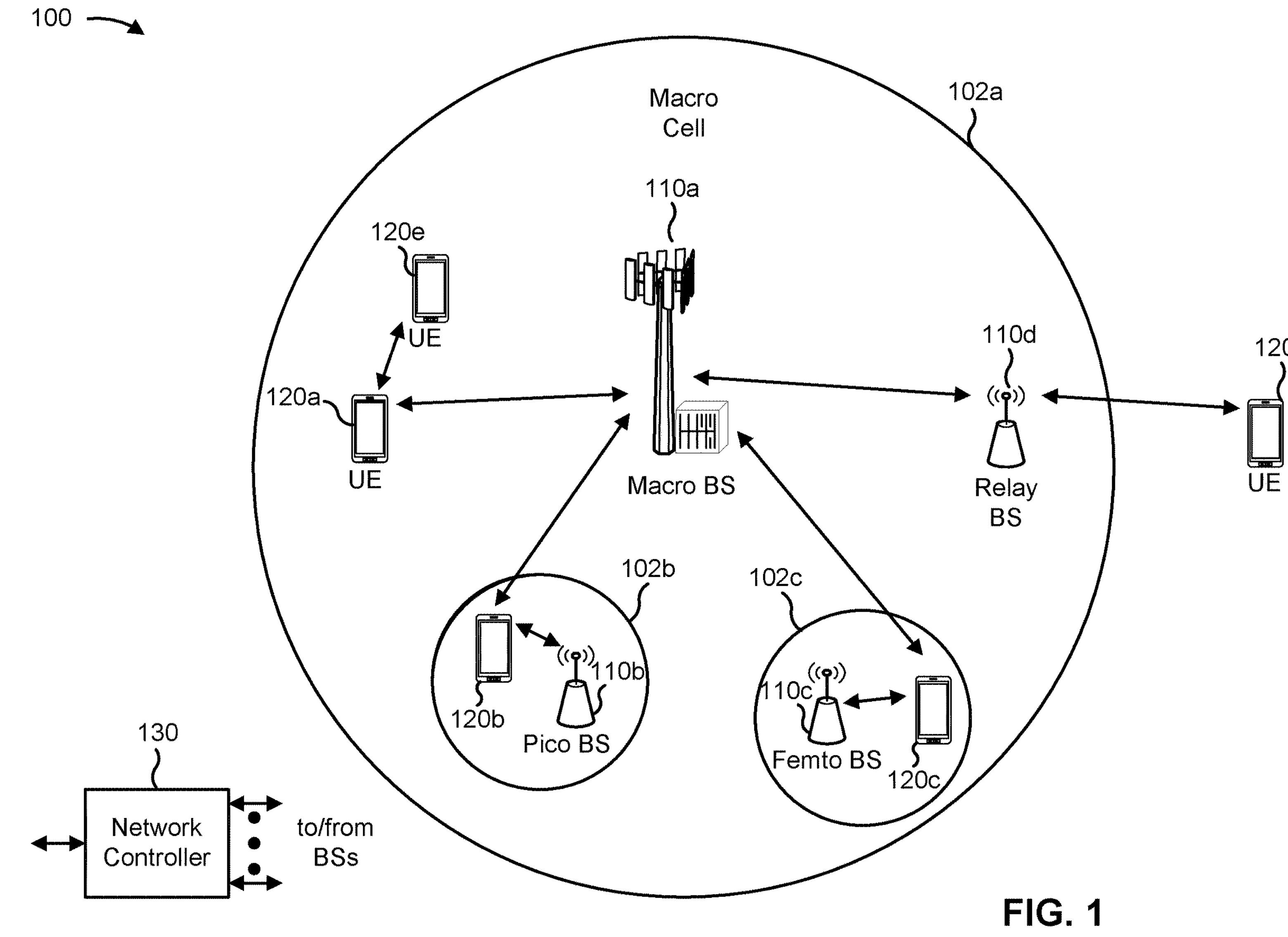
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110*a*, BS 110*b*, BS 110*c*, and BS 110*d*) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110*d* may communicate with macro BS 110*a* and a UE 120*d* in order to facilitate communication between BS 110*a* and UE 120*d*. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
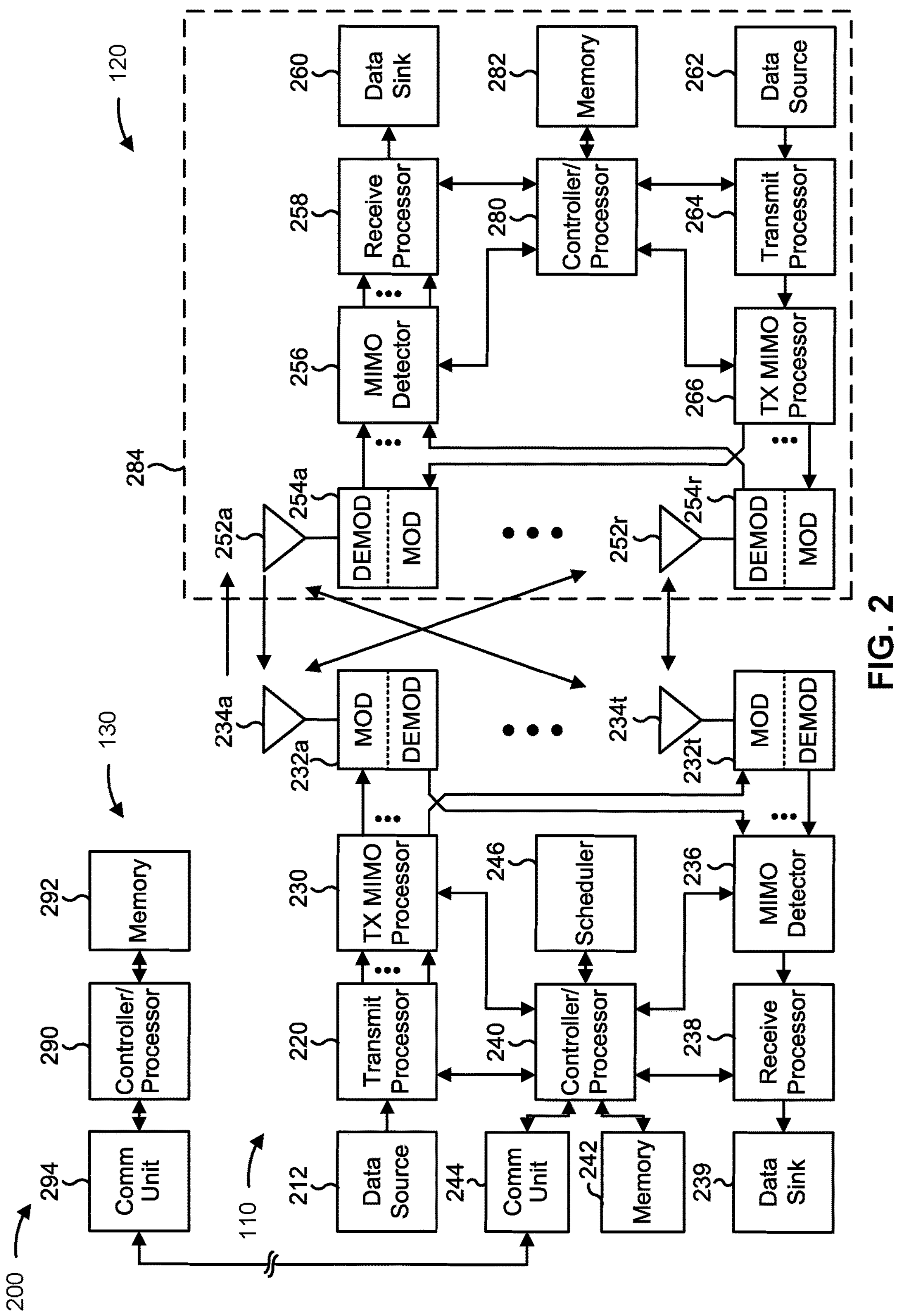
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234*a* through 234*t* and/or antennas 252*a* through 252*r*) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 3-8).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 3-8).

Controller/processor 240 of base station 110, controller/processor 280 of UE 120, and/or any other component(s) of FIG. 2 may perform one or more techniques associated with subband beam reporting, as described in more detail elsewhere herein. For example, controller/processor 240 of base station 110, controller/processor 280 of UE 120, and/or any other component(s) of FIG. 2 may perform or direct operations of, for example, process 500 of FIG. 5, process 600 of FIG. 6, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 500 of FIG. 5, process 600 of FIG. 6, and/or other processes as described herein. In some aspects, executing instructions may include running the instructions, converting the instructions, compiling the instructions, and/or interpreting the instructions, among other examples.

In some aspects, the UE includes means for receiving configuration information for a beam report, wherein the configuration information indicates whether the beam report is associated with at least one of a subband granularity or a wideband granularity, wherein the beam report is for a reference signal received power (RSRP) measurement or a signal to interference plus noise ratio (SINR) measurement, and wherein the beam report is based at least in part on a channel state information reference signal (CSI-RS) or a synchronization signal block (SSB); means for determining the beam report based at least in part on the configuration information; and/or means for transmitting the beam report. The means for the user equipment (UE) to perform operations described herein may include, for example, antenna 252, demodulator 254, MIMO detector 256, receive processor 258, transmit processor 264, TX MIMO processor 266, modulator 254, controller/processor 280, and/or memory 282.

In some aspects, the UE includes means for receiving information indicating a set of subbands for the beam report.

In some aspects, the UE includes means for selecting the set of CMRs, or CMR and IMR pairs, based at least in part on one or more measurement values for a wideband.

In some aspects, the UE includes means for selecting the set of CMRs, or CMR and IMR pairs, based at least in part on a corresponding set of measurement values for one or more subbands.

In some aspects, the base station includes means for transmitting, to a UE, configuration information for a beam report, wherein the configuration information indicates whether the beam report is associated with at least one of a subband granularity or a wideband granularity, wherein the beam report is for a reference signal received power (RSRP) measurement or a signal to interference plus noise ratio (SINR) measurement, and wherein the beam report is based at least in part on a channel state information reference signal (CSI-RS) or a synchronization signal block (SSB); and/or means for receiving the beam report based at least in part on the configuration information. The means for the base station to perform operations described herein may include, for example, transmit processor 220, TX MIMO processor 230, modulator 232, antenna 234, demodulator 232, MIMO detector 236, receive processor 238, controller/processor 240, memory 242, and/or scheduler 246.

In some aspects, the base station includes means for transmitting information indicating a set of subbands for the beam report.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

FIG. 3 is a diagram illustrating an example 300 of physical channels and reference signals in a wireless network, in accordance with the present disclosure. As shown in FIG. 3, downlink channels and downlink reference signals may carry information from a base station 110 to a UE 120, and uplink channels and uplink reference signals may carry information from a UE 120 to a base station 110.

As shown, a downlink channel may include a physical downlink control channel (PDCCH) that carries downlink control information (DCI), a physical downlink shared channel (PDSCH) that carries downlink data, or a physical broadcast channel (PBCH) that carries system information, among other examples. In some aspects, PDSCH communications may be scheduled by PDCCH communications. As further shown, an uplink channel may include a physical uplink control channel (PUCCH) that carries uplink control information (UCI), a physical uplink shared channel (PUSCH) that carries uplink data, or a physical random access channel (PRACH) used for initial network access, among other examples. In some aspects, the UE 120 may transmit acknowledgement (ACK) or negative acknowledgement (NACK) feedback (e.g., ACK/NACK feedback or ACK/NACK information) in UCI on the PUCCH and/or the PUSCH.

As further shown, a downlink reference signal may include a synchronization signal block (SSB), a channel state information (CSI) reference signal (CSI-RS), a demodulation reference signal (DMRS), a positioning reference signal (PRS), or a phase tracking reference signal (PTRS), among other examples. As also shown, an uplink reference signal may include a sounding reference signal (SRS), a DMRS, or a PTRS, among other examples.

An SSB may carry information used for initial network acquisition and synchronization, such as a primary synchronization signal (PSS), a secondary synchronization signal (SSS), a PBCH, and a PBCH DMRS. An SSB is sometimes referred to as a synchronization signal/PBCH (SS/PBCH) block. In some aspects, the base station 110 may transmit multiple SSBs on multiple corresponding beams, and the SSBs may be used for beam selection.

A CSI-RS may carry information used for downlink channel estimation (e.g., downlink CSI acquisition), which may be used for scheduling, link adaptation, or beam management, among other examples. The base station 110 may configure a set of CSI-RSs for the UE 120, and the UE 120 may measure the configured set of CSI-RSs. Based at least in part on the measurements, the UE 120 may perform channel estimation and may report channel estimation parameters to the base station 110 (e.g., in a CSI report), such as a channel quality indicator (CQI), a precoding matrix indicator (PMI), a CSI-RS resource indicator (CRI), a layer indicator (LI), a rank indicator (RI), or a reference signal received power (RSRP), among other examples. The base station 110 may use the CSI report to select transmission parameters for downlink communications to the UE 120, such as a number of transmission layers (e.g., a rank), a precoding matrix (e.g., a precoder), a modulation and coding scheme (MCS), or a refined downlink beam (e.g., using a beam refinement procedure or a beam management procedure), among other examples.

A DMRS may carry information used to estimate a radio channel for demodulation of an associated physical channel (e.g., PDCCH, PDSCH, PBCH, PUCCH, or PUSCH). The design and mapping of a DMRS may be specific to a physical channel for which the DMRS is used for estimation. DMRSs are UE-specific, can be beamformed, can be confined in a scheduled resource (e.g., rather than transmitted on a wideband), and can be transmitted only when necessary. As shown, DMRSs are used for both downlink communications and uplink communications.

A PTRS may carry information used to compensate for oscillator phase noise. Typically, the phase noise increases as the oscillator carrier frequency increases. Thus, PTRS can be utilized at high carrier frequencies, such as millimeter wave frequencies, to mitigate phase noise. The PTRS may be used to track the phase of the local oscillator and to enable suppression of phase noise and common phase error (CPE). As shown, PTRSs are used for both downlink communications (e.g., on the PDSCH) and uplink communications (e.g., on the PUSCH).

An SRS may carry information used for uplink channel estimation, which may be used for scheduling, link adaptation, precoder selection, or beam management, among other examples. The base station 110 may configure one or more SRS resource sets for the UE 120, and the UE 120 may transmit SRSs on the configured SRS resource sets. An SRS resource set may have a configured usage, such as uplink CSI acquisition, downlink CSI acquisition for reciprocity-based operations, uplink beam management, among other examples. The base station 110 may measure the SRSs, may perform channel estimation based at least in part on the measurements, and may use the SRS measurements to configure communications with the UE 120.

As indicated above, FIG. 3 is provided as an example. Other examples may differ from what is described with regard to FIG. 3.

A base station may configure a UE to perform measurements, such as channel measurements, interference measurements, and/or the like. In communication systems utilizing beamforming, such as those using an NR radio access technology (RAT) in a higher frequency range (e.g., FR2, Frequency Range 4, or a higher frequency range), these measurements may be performed for different beams. For example, a base station may transmit a reference signal on a transmit beam, and a UE may measure the reference signal by generating a receive beam. A combination of a transmit beam and a receive beam may be referred to as a beam pair. The transmit beam and/or the receive beam of the beam pair may be referred to as a candidate beam. The UE may measure multiple beam pairs to identify one or more suitable beam pairs for communication between the UE and the base station. The UE may transmit a measurement report indicating measurement values for a set of beam pairs. The measurement values may indicate, for example, a Layer 1 reference signal received power (L1-RSRP), a Layer 1 signal to interference plus noise (L1-SINR), a CSI resource indicator RSRP (CRI-RSRP), a synchronization signal block index RSRP (SSB-Index-RSRP), a CRI-SINR, an SSB-Index-SINR, or another value.

Some RATs may provide for communication on one or more subbands of a wideband. For example, a wideband may include an operating bandwidth or frequency of a UE and may be subdivided into two or more subbands. In one example, an 80 MHz wideband may be divided into four 20 MHz subbands. Many measurements, such as Layer 1 RSRP and SINR, CRI-RSRP and SINR, and SSB RSRP and SINR, are configured and performed at the wideband granularity, meaning that a measurement may be determined with reference to an entire wideband. However, a measurement based at least in part on a wideband granularity may provide imprecise information regarding channel conditions on subbands of the wideband. For example, a candidate beam may be viable on some subbands of a wideband and not on other subbands or may be viable at a subband granularity but not at a wideband granularity. Furthermore, performing measurements at a wideband granularity may lead to inefficiency in operation of the UE and/or the base station. For example, the base station may configure the UE to determine and report channel quality indicators (CQIs) for subbands of the wideband. If the base station has access to only wideband granularity measurement reporting, then the base station may not be able to selectively configure CQI reporting at a subband granularity, thereby increasing resource usage associated with CQI configuration and reporting.

Some techniques and apparatuses described herein provide configuration of beam reporting at a subband granularity. For example, some techniques and apparatuses described herein provide configuration of one or more channel measurement resources (CMRs) and/or one or more interference measurement resources (IMRs) at a subband granularity, or selectively at a subband or wideband granularity. Some techniques and apparatuses described herein provide configuration of a subband L1 beam report for each CMR for an L1-RSRP report, or for each CMR and IMR pair for an L1-SINR report. In this way, the base station can configure, and the UE can perform, subband granularity L1 beam reporting, which improves an accuracy of beam selection and a flexibility of configuration of subsequent measurements, reporting, and communication.

As used herein, a measurement performed at a wideband granularity is a measurement that is performed across a wideband (e.g., based at least in part on one or more reference signals distributed across the wideband) and a measurement performed at a subband granularity is a measurement that is performed across a subband and not a wideband that includes the subband.

Figure 4:
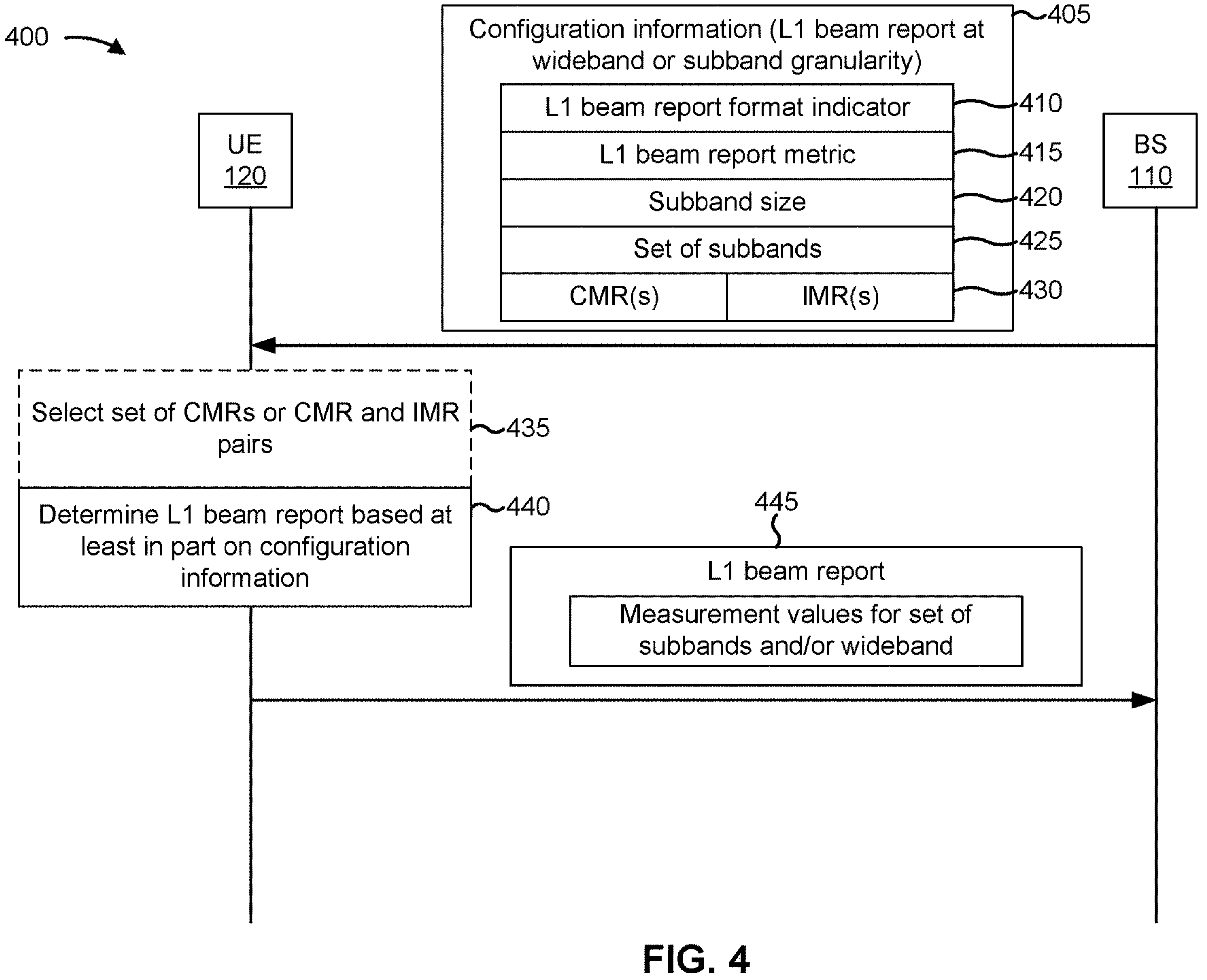
FIG. 4 is a diagram illustrating an example of L1 beam reporting at a subband granularity, in accordance with the present disclosure.

FIG. 4 is a diagram illustrating an example 400 of L1 beam reporting at a subband granularity, in accordance with the present disclosure. As shown, example 400 includes a UE 120 and a BS 110.

As shown in FIG. 4, and by reference number 405, the BS 110 may transmit configuration information to the UE 120. For example, the BS 110 may transmit the configuration information via radio resource control (RRC) signaling, medium access control (MAC) signaling, and/or the like. In some aspects, the configuration information may include a CSI report configuration (e.g., a CSI-ReportConfig RRC message or a similar message). As further shown, the configuration information may configure an L1 beam report, sometimes referred to herein as a beam report. For example, the configuration information may configure the UE 120 to determine and/or transmit an L1 beam report indicating an L1-RSRP measurement, an L1-SINR measurement, and/or the like. As shown, the L1 beam report may be associated with a wideband and subband granularity (e.g., meaning that the L1 beam report includes information regarding one or more widebands and one or more subbands) or a subband granularity (e.g., meaning that the L1 beam report includes information regarding one or more subbands). For example, the configuration information may indicate whether the L1 beam report is associated with the wideband granularity or a subband granularity. In some aspects, the configuration information may indicate a report quantity for the L1 beam report. The report quantity may identify a type of measurement to report, such as a CRI-RSRP, an SSB-Index-RSRP, a CRI-SINR, an SSB-Index-SINR, or another quantity. As shown by reference numbers 410, 415, 420, 425, and 430, the configuration information may indicate various parameters associated with the L1 beam report. The L1 beam report may be based at least in part on an SSB or a CSI-RS. For example, the measurement reported via the L1 beam report may be a measurement on an SSB or a CSI-RS.

As shown by reference number 410, the configuration information may include a beam report format indicator such as an L1 beam report format indicator. In some aspects, the beam report format indicator of the configuration information indicates whether the beam report is associated with at least one of the subband granularity or the wideband granularity. For example, if the L1 beam report is associated with a CRI-RSRP quantity or an SSB-Index-RSRP quantity (e.g., if the report quantity is an RSRP quantity), then the configuration information may include an L1 RSRP format indicator (e.g., L1-RSRP-FormatIndicator) with candidate values indicating whether the RSRP format is associated with a wideband granularity (e.g., WidebandRSRP), a subband granularity (e.g., SubbandRSRP), or a combination thereof (e.g., WidebandAndSubbandRSRP). As another example, if the L1 beam report is associated with a CRI-SINR quantity or an SSB-Index-SINR quantity (e.g., if the report quantity is an SINR quantity), then the configuration information may include an L1 SINR format indicator (e.g., L1-SINR-FormatIndicator) with candidate values indicating whether the SINR format is associated with a wideband granularity (e.g., WidebandSINR), a subband granularity (e.g., SubbandSINR), or a combination thereof (e.g., WidebandAndSubbandSINR).

As shown by reference number 415, the configuration information may include an L1 beam report metric. A beam report metric may include a report quantity, such as an RSRP quantity or an SINR quantity. In some aspects, a beam report metric of the beam report indicates whether the beam report is associated with at least one of the subband granularity or the wideband granularity. For example, if the L1 beam report is associated with an L1-RSRP measurement (e.g., if the report quantity is an RSRP quantity), a CRI-RSRP metric or an SSB index RSRP metric may be associated with candidate values indicating whether the L1 beam report is associated with a subband granularity (e.g., CRI-RSRP-Subband or SSB-Index-RSRP-Subband) or a subband and wideband granularity (e.g., CRI-RSRP-WidebandAndSubband, SSB-Index-RSRP-WidebandAndSubband). As another example, if the L1 beam report is associated with an L1-SINR measurement (e.g., if the report quantity is an SINR quantity), a CRI-SINR metric or an SSB index SINR metric may be associated with candidate values indicating whether the L1 beam report is associated with a subband granularity (e.g., CRI-SINR-Subband or SSB-Index-SINR-Subband) or a subband and wideband granularity (e.g., CRI-SINR-WidebandAndSubband, SSB-Index-SINR-WidebandAndSubband).

As shown by reference number 420, the configuration information may include information indicating a subband size. In some aspects, the subband size may be defined as a contiguous set of physical resource blocks (PRBs). For example, the subband size may be based at least in part on a bandwidth of a bandwidth part of the UE 120 (e.g., an active bandwidth part of the UE 120). For example, the subband size may depend on the bandwidth of the bandwidth part (e.g., a mapping may be defined between subband sizes and bandwidths of bandwidth parts).

In some aspects, the subband size may have multiple candidate values. For example, the subband size may have multiple candidate values for a bandwidth of a bandwidth part. For example, the bandwidth part of the bandwidth may be associated with multiple subband sizes. In this case, a selected subband size may be indicated to the UE 120 by the BS 110 in the configuration information or in another message (e.g., via RRC signaling, MAC signaling, downlink control information (DCI), and/or the like). The table shown below illustrates an example of bandwidths of the active bandwidth part and corresponding subband sizes.

| Bandwidth part (PRBs) | Subband size (PRBs) |
|---|---|
| 24-72 | 4, 8 |
| 73-144 | 8, 16 |
| 145-275 | 16, 32 |

As shown by reference number 425, the configuration information may include information indicating a set of subbands. For example, the information indicating the set of subbands may include a bitmap and/or the like. In some aspects, the UE 120 may receive information that indicates the set of subbands separately from the configuration information. For example, the UE 120 may receive information via RRC signaling, MAC signaling, DCI signaling, and/or the like, indicating the set of subbands. The UE 120 may determine the L1 beam report based at least in part on the set of subbands. For example, the UE 120 may perform measurements on the set of subbands as indicated by the L1 beam report. In some aspects, the subset of subbands can be indicated via a bitmap, where each bit corresponds to a candidate subband and a value (e.g., 1) indicates that the corresponding subband is selected for the L1 beam report. The bitmap can be indicated by the BS 110 via RRC, a MAC control element (CE), or DCI. In some aspects, the bitmap may use a similar structure as a CSI-ReportingBand RRC parameter for a subband CQI report. In some aspects, the frequency density of each CSI-RS port per PRB in each indicated subband may be equal to a configured density of the CSI-RS resource. Furthermore, if the L1 beam report is based at least in part on a CSI interference management (CSI-IM) resource, then all PRBs in each subband indicated by the bitmap may include one or more CSI-IM resource elements. A configured density of a CSI-RS resource indicates a ratio of resource blocks in which a CSI-RS is transmitted to total resource blocks (e.g., a density of 1 means that a CSI-RS is transmitted in every resource block within a configured CSI-RS bandwidth). The frequency density of a CSI-RS port may be equal to the configured density of the CSI-RS resource. A CSI-IM resource is a set of resource elements reserved for interference management.

As shown by reference number 430, the configuration information may indicate one or more CMRs and/or one or more IMRs. A CMR indicates a resource in which the UE 120 is to determine a channel measurement. For example, the UE 120 may determine an L1-RSRP value based at least in part on a CMR. An IMR indicates a resource based at least in part on which the UE 120 is to determine an interference measurement. For example, the UE 120 may determine an L1-SINR value or an L1 reference signal received quality (RSRQ) based at least in part on a CMR and IMR pair. In some aspects, the BS 110 may configure a single CMR, or a single CMR and IMR pair, for a subband granularity L1 beam report. For example, the BS 110 may be permitted to configure only a single CMR, or a single CMR and IMR pair, for a given subband granularity L1 beam report.

In some aspects, the BS 110 may configure multiple CMRs, or multiple CMR and IMR pairs, for a subband granularity L1 beam report. In this case, as shown by reference number 435, the UE 120 may select a CMR and/or a set of CMR and IMR pairs from the multiple CMRs or the multiple CMR and IMR pairs. For example, the UE 120 may select up to X CMRs or CMR and IMR pairs and may report subband granularity L1 metrics for the selected X CMRs or CMR and IMR pairs. In some aspects, the value of X may be indicated via RRC signaling, MAC signaling, DCI, and/or the like. In some aspects, the UE 120 may select the X CMRs or CMR and IMR pairs based at least in part on corresponding wideband metric values. For example, the UE 120 may select the X CMRs or CMR and IMR pairs with the highest L1-RSRP, L1-SINR, or L1-RSRQ values. In some aspects, the UE 120 may select the X CMRs or CMR and IMR pairs based at least in part on corresponding subband metric values. For example, the UE 120 may select the X CMRs or CMR and IMR pairs with a highest of a minimum value (of an L1-RSRP, L1-SINR, or L1-RSRQ value) across all subbands. In some aspects, the BS 110 may transmit, to the UE 120, information indicating a criterion for selecting the X CMRs or CMR and IMR pairs, such as a wideband metric value, a subband metric value, and/or the like.

As shown by reference number 440, the UE 120 may determine the L1 beam report based at least in part on the configuration information. For example, the UE 120 may perform measurements on SSBs, CSI-RSs, and/or the like, on one or more subbands and/or one or more widebands, based at least in part on one or more CMRs and/or one or more IMRs. As shown by reference number 445, the UE 120 may transmit an L1 beam report. The L1 beam report may indicate one or more measurement values (e.g., L1 measurement values) determined based at least in part on the configuration information. For example, the L1 beam report may indicate one or more absolute values and/or one or more differential values relative to the absolute value, as described in more detail below. An absolute value (sometimes referred to herein as an absolute measurement value) is a value that is defined without reference to another value. A differential value (sometimes referred to herein as a differential measurement value) is a value that indicates an offset relative to a reference value (such as an absolute value) by which a measurement value can be determined (e.g., measurement value=reference value+offset).

In some aspects, the L1 beam report may be based at least in part on a set of CMRs (e.g., one or more CMRs) or a set of CMR and IMR pairs (e.g., one or more CMR and IMR pairs), and the L1 beam report may be associated with a subband granularity. In such a case, in some aspects, the L1 beam report may indicate an absolute value for each subband associated with the L1 beam report. In some aspects, the L1 beam report may indicate an absolute value for a reference subband and may indicate one or more differential values for each remaining reported subband relative to the absolute value. For example, the reference subband may be a first reported subband, a subband with a highest absolute value, a subband with a lowest absolute value, and/or the like. In some aspects, the reference subband may be a first subband of a first reported CMR or CMR and IMR pair.

In some aspects, the L1 beam report may be based at least in part on a set of CMRs (e.g., one or more CMRs) or a set of CMR and IMR pairs (e.g., one or more CMR and IMR pairs), and the L1 beam report is associated with a subband and wideband granularity. In this case, in some aspects, the L1 beam report may indicate an absolute value for a wideband associated with the L1 beam report and an absolute value for each subband associated with the L1 beam report. In some aspects, the L1 beam report may indicate an absolute value for a wideband associated with the L1 beam report and a differential value, relative to the absolute value, for each subband associated with the L1 beam report.

In some aspects, the L1 beam report may relate to a plurality of subbands. In this case, the L1 beam report may indicate information regarding the plurality of subbands in an order. For example, the order may be based at least in part on the information indicating the set of subbands shown by reference number 425. More specifically, the reported subbands may be numbered continuously in increasing order starting with a lowest subband, of the information indicating the set of subbands.

In some aspects, the L1 beam report may be based at least in part on multiple CMRs or multiple CMR and IMR pairs. In this case, for a subband granularity L1 beam report, the UE 120 may report an absolute value for a reference subband and may report one or more differential values for one or more remaining subbands associated with the L1 beam report. In this case, the UE 120 may select the reference subband across all reported resources or resource pairs (e.g., a first subband of a first reported CMR or a first reported CMR and IMR pair). In some aspects, for a subband and wideband granularity L1 beam report, the UE 120 may select a reference subband or a reference wideband and may report an absolute value for the reference subband or the reference wideband. The UE 120 may report one or more differential values for one or more remaining subbands and/or widebands associated with the L1 beam report. In some aspects, the UE 120 may select the reference subband or the reference wideband across all reported resources or resource pairs.

As indicated above, FIG. 4 is provided as an example. Other examples may differ from what is described with regard to FIG. 4.

Figure 5:
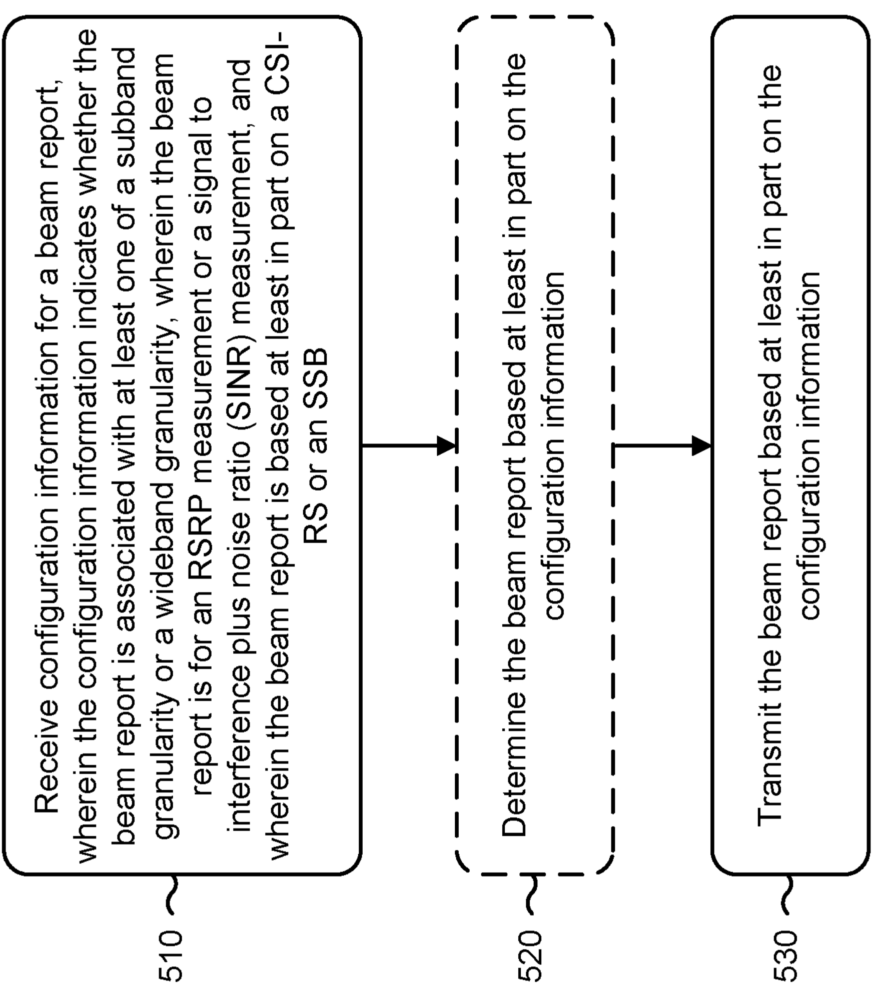
FIG. 5 is a diagram illustrating an example process performed, for example, by a UE, in accordance with the present disclosure.

FIG. 5 is a diagram illustrating an example process 500 performed, for example, by a UE, in accordance with the present disclosure. Example process 500 is an example where the UE (e.g., UE 120) performs operations associated with subband beam reporting.

As shown in FIG. 5, in some aspects, process 500 may include receiving configuration information for a beam report, wherein the configuration information indicates whether the beam report is associated with at least one of a subband granularity or a wideband granularity, wherein the beam report is for an RSRP measurement or an SINR measurement, and wherein the beam report is based at least in part on a CSI-RS or an SSB (block 510). For example, the UE (e.g., using reception component 702, depicted in FIG. 7) may receive configuration information for a beam report, wherein the configuration information indicates whether the beam report is associated with at least one of a subband granularity or a wideband granularity, wherein the beam report is for an RSRP measurement or an SINR measurement, and wherein the beam report is based at least in part on a CSI-RS or an SSB, as described above.

As further shown in FIG. 5, in some aspects, process 500 may optionally include determining the beam report based at least in part on the configuration information (block 520). For example, the UE (e.g., using determination component 708, depicted in FIG. 7) may determine the beam report based at least in part on the configuration information, as described above.

As further shown in FIG. 5, in some aspects, process 500 may include transmitting the beam report based at least in part on the configuration information (block 530). For example, the UE (e.g., using transmission component 704, depicted in FIG. 7) may transmit the beam report based at least in part on the configuration information, as described above.

Process 500 may include additional aspects, such as any single aspect or any combination of aspects described below and/or in connection with one or more other processes described elsewhere herein.

In a first aspect, the beam report comprises a Layer 1 beam report.

In a second aspect, alone or in combination with the first aspect, a beam report format indicator of the configuration information indicates whether the beam report is associated with at least one of the subband granularity or the wideband granularity.

In a third aspect, alone or in combination with one or more of the first and second aspects, a beam report metric of the beam report indicates whether the beam report is associated with at least one of the subband granularity or the wideband granularity.

In a fourth aspect, alone or in combination with one or more of the first through third aspects, the beam report is associated with the subband granularity, and a subband size for the beam report is defined as a contiguous set of physical resource blocks (PRBs).

In a fifth aspect, alone or in combination with one or more of the first through fourth aspects, the subband size is based at least in part on a bandwidth of a bandwidth part of the UE.

In a sixth aspect, alone or in combination with one or more of the first through fifth aspects, the bandwidth of the bandwidth part of the UE is associated with multiple subband sizes, and the subband size for the beam report is indicated to the UE.

In a seventh aspect, alone or in combination with one or more of the first through sixth aspects, the beam report is associated with the subband granularity, and process 500 includes receiving information indicating a set of subbands for the beam report.

In an eighth aspect, alone or in combination with one or more of the first through seventh aspects, the set of subbands is indicated via a bitmap.

In a ninth aspect, alone or in combination with one or more of the first through eighth aspects, the information indicating the set of subbands is included in the configuration information.

In a tenth aspect, alone or in combination with one or more of the first through ninth aspects, a resource associated with the CSI-RS is associated with a same frequency density as each CSI-RS port per physical resource block in each subband of the set of subbands.

In an eleventh aspect, alone or in combination with one or more of the first through tenth aspects, the beam report is based at least in part on a CSI-IM resource, and each physical resource block in each subband of the set of subbands includes one or more CSI-IM resource elements.

In a twelfth aspect, alone or in combination with one or more of the first through eleventh aspects, the beam report indicates absolute measurement values for each subband of a set of subbands associated with the beam report.

In a thirteenth aspect, alone or in combination with one or more of the first through twelfth aspects, the beam report indicates an absolute measurement value for a reference subband of a set of subbands associated with the beam report, and the beam report indicates one or more differential measurement values for one or more other subbands, of the set of subbands, relative to the absolute measurement value.

In a fourteenth aspect, alone or in combination with one or more of the first through thirteenth aspects, the beam report indicates one or more absolute measurement values for each subband of a set of subbands associated with the beam report and an absolute measurement value for a wideband associated with the beam report.

In a fifteenth aspect, alone or in combination with one or more of the first through fourteenth aspects, the beam report indicates an absolute measurement value for a wideband associated with the beam report, and the beam report indicates one or more differential measurement values for one or more subbands, of a set of subbands associated with the beam report, relative to the absolute measurement value.

In a sixteenth aspect, alone or in combination with one or more of the first through fifteenth aspects, the configuration information indicates a single CMR, or a single CMR and interference measurement resource (IMR) pair.

In a seventeenth aspect, alone or in combination with one or more of the first through sixteenth aspects, the configuration information indicates multiple CMR or multiple CMR and IMR pairs, and the beam report is based at least in part on a set of CMRs or CMR and IMR pairs.

In an eighteenth aspect, alone or in combination with one or more of the first through seventeenth aspects, process 500 includes selecting the set of CMRs, or CMR and IMR pairs, based at least in part on one or more measurement values for a wideband.

In a nineteenth aspect, alone or in combination with one or more of the first through eighteenth aspects, process 500 includes selecting the set of CMRs, or CMR and IMR pairs, based at least in part on a corresponding set of measurement values for one or more subbands.

In a twentieth aspect, alone or in combination with one or more of the first through nineteenth aspects, the beam report indicates an absolute measurement value for a reference subband of a set of subbands corresponding to the set of CMRs or CMR and IMR pairs, and the beam report indicates one or more differential measurement values for one or more other subbands, of the set of subbands corresponding to the set of CMRs or CMR and IMR pairs, relative to the absolute measurement value.

In a twenty-first aspect, alone or in combination with one or more of the first through twentieth aspects, the beam report indicates an absolute measurement value for a reference subband or wideband, of a set of subbands or widebands corresponding to the set of CMRs or CMR and IMR pairs, and the beam report indicates one or more differential measurement values for one or more other subbands or widebands, of the set of subbands or widebands corresponding to the set of CMRs or CMR and IMR pairs, relative to the absolute measurement value.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
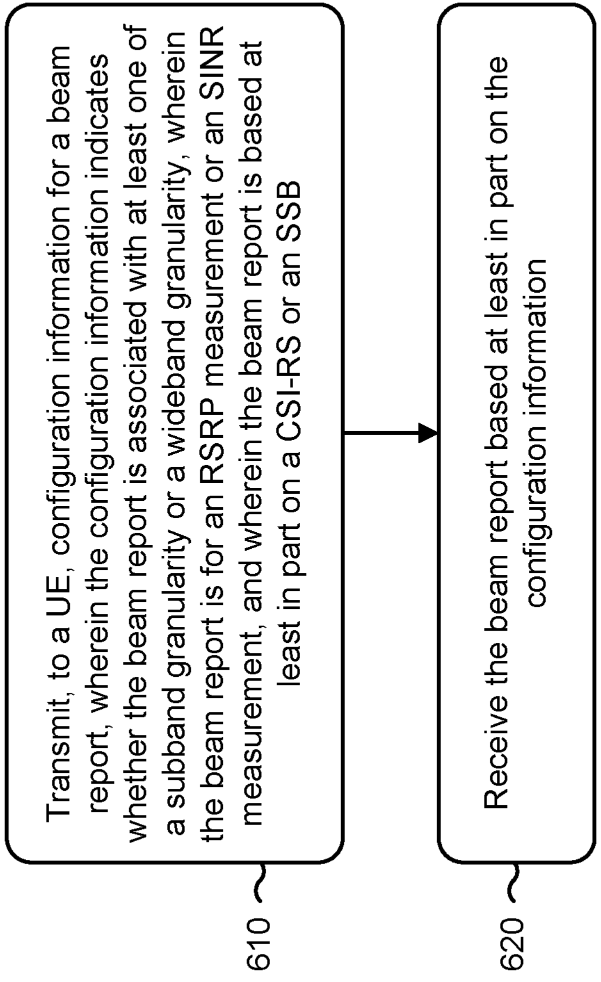
FIG. 6 is a diagram illustrating an example process performed, for example, by a base station, in accordance with the present disclosure.

FIG. 6 is a diagram illustrating an example process 600 performed, for example, by a base station, in accordance with the present disclosure. Example process 600 is an example where the base station (e.g., base station 110) performs operations associated with subband beam reporting.

As shown in FIG. 6, in some aspects, process 600 may include transmitting, to a UE, configuration information for a beam report, wherein the configuration information indicates whether the beam report is associated with at least one of a subband granularity or a wideband granularity, wherein the beam report is for an RSRP measurement or an SINR measurement, and wherein the beam report is based at least in part on a CSI-RS or an SSB (block 610). For example, the base station (e.g., using transmission component 804, depicted in FIG. 8) may transmit, to a UE, configuration information for a beam report, wherein the configuration information indicates whether the beam report is associated with at least one of a subband granularity or a wideband granularity, wherein the beam report is for an RSRP measurement or an SINR measurement, and the beam report is based at least in part on a CSI-RS or an SSB, as described above.

As further shown in FIG. 6, in some aspects, process 600 may include receiving the beam report based at least in part on the configuration information (block 620). For example, the base station (e.g., using reception component 802, depicted in FIG. 8) may receive the beam report based at least in part on the configuration information, as described above.

Process 600 may include additional aspects, such as any single aspect or any combination of aspects described below and/or in connection with one or more other processes described elsewhere herein.

In a first aspect, the beam report comprises a Layer 1 beam report.

In a second aspect, alone or in combination with the first aspect, a beam report format indicator of the configuration information indicates whether the beam report is associated with at least one of the subband granularity or the wideband granularity.

In a third aspect, alone or in combination with one or more of the first and second aspects, a beam report metric of the beam report indicates whether the beam report is associated with at least one of the subband granularity or the wideband granularity.

In a fourth aspect, alone or in combination with one or more of the first through third aspects, the beam report is associated with the subband granularity, and a subband size for the beam report is defined as a contiguous set of PRBs.

In a fifth aspect, alone or in combination with one or more of the first through fourth aspects, the subband size is based at least in part on a bandwidth of a bandwidth part of the UE.

In a sixth aspect, alone or in combination with one or more of the first through fifth aspects, the bandwidth of the bandwidth part of the UE is associated with multiple subband sizes, and the subband size for the beam report is indicated to the UE.

In a seventh aspect, alone or in combination with one or more of the first through sixth aspects, the beam report is associated with the subband granularity, and process 600 includes transmitting information indicating a set of subbands for the beam report.

In an eighth aspect, alone or in combination with one or more of the first through seventh aspects, the set of subbands is indicated via a bitmap.

In a ninth aspect, alone or in combination with one or more of the first through eighth aspects, the information indicating the set of subbands is included in the configuration information.

In a tenth aspect, alone or in combination with one or more of the first through ninth aspects, a resource associated with the CSI-RS is associated with a same frequency density as each CSI-RS port per physical resource block in each subband of the set of subbands.

In an eleventh aspect, alone or in combination with one or more of the first through tenth aspects, the beam report is based at least in part on a CSI interference measurement (CSI-IM) resource, and each physical resource block in each subband of the set of subbands includes one or more CSI-IM resource elements.

In a twelfth aspect, alone or in combination with one or more of the first through eleventh aspects, the beam report indicates absolute measurement values for each subband of a set of subbands associated with the beam report.

In a thirteenth aspect, alone or in combination with one or more of the first through twelfth aspects, the beam report indicates an absolute measurement value for a reference subband of a set of subbands associated with the beam report, and the beam report indicates one or more differential measurement values for one or more other subbands, of the set of subbands, relative to the absolute measurement value.

In a fourteenth aspect, alone or in combination with one or more of the first through thirteenth aspects, the beam report indicates one or more absolute measurement values for each subband of a set of subbands associated with the beam report and an absolute measurement value for a wideband associated with the beam report.

In a fifteenth aspect, alone or in combination with one or more of the first through fourteenth aspects, the beam report indicates an absolute measurement value for a wideband associated with the beam report, and the beam report indicates one or more differential measurement values for one or more subbands, of a set of subbands associated with the beam report, relative to the absolute measurement value.

In a sixteenth aspect, alone or in combination with one or more of the first through fifteenth aspects, the configuration information indicates a single CMR, or a single CMR and IMR pair.

In a seventeenth aspect, alone or in combination with one or more of the first through sixteenth aspects, the configuration information indicates multiple CMR, or multiple CMR and IMR pairs, and the beam report is based at least in part on a set of CMRs, or CMR and IMR pairs.

In an eighteenth aspect, alone or in combination with one or more of the first through seventeenth aspects, the beam report indicates an absolute measurement value for a reference subband of a set of subbands corresponding to the set of CMRs, or CMR and IMR pairs, and the beam report indicates one or more differential measurement values for one or more other subbands, of the set of subbands corresponding to the set of CMRs, or CMR and IMR pairs, relative to the absolute measurement value.

In a nineteenth aspect, alone or in combination with one or more of the first through eighteenth aspects, the beam report indicates an absolute measurement value for a reference subband or wideband, of a set of subbands or widebands corresponding to the set of CMRs or CMR and IMR pairs, and the beam report indicates one or more differential measurement values for one or more other subbands or widebands, of the set of subbands or widebands corresponding to the set of CMRs, or CMR and IMR pairs, relative to the absolute measurement value.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
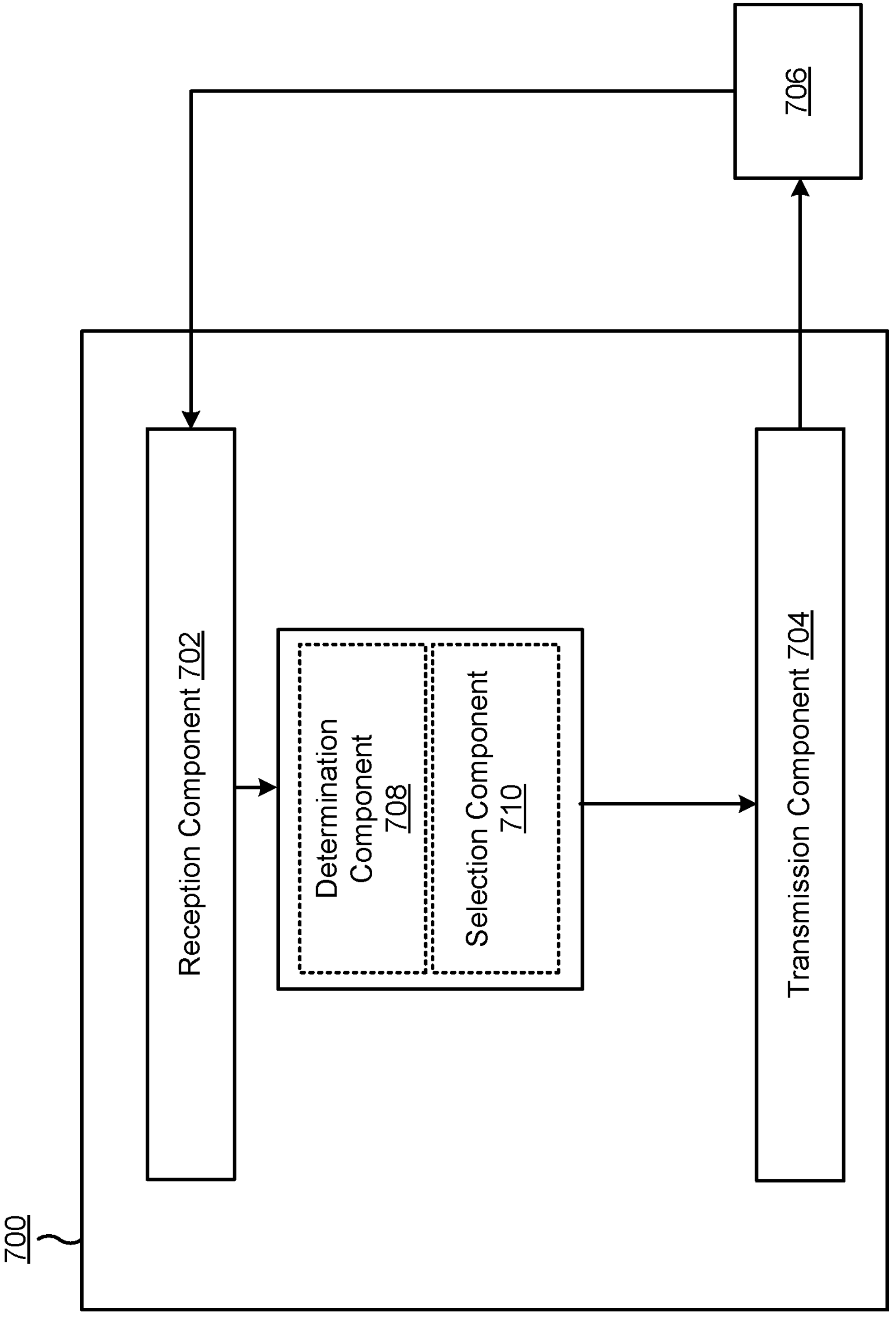
FIG. 7 is a block diagram of an example apparatus for wireless communication, in accordance with the present disclosure.

FIG. 7 is a block diagram of an example apparatus 700 for wireless communication. The apparatus 700 may be a UE, or a UE may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include one or more of a determination component 708 or a selection component 710, among other examples.

In some aspects, the apparatus 700 may be configured to perform one or more operations described herein in connection with FIGS. 3-4. Additionally, or alternatively, the apparatus 700 may be configured to perform one or more processes described herein, such as process 500 of FIG. 5. In some aspects, the apparatus 700 and/or one or more components shown in FIG. 7 may include one or more components of the UE described above in connection with FIG. 2. Additionally, or alternatively, one or more components shown in FIG. 7 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 706. In some aspects, the reception component 702 may include one or more antennas, a demodulator, a MIMO detector, a receive processor, a controller/processor, a memory, or a combination thereof, of the UE described above in connection with FIG. 2.

The transmission component 704 may transmit communications, such as reference signals, control information, data communications, or a combination thereof, to the apparatus 706. In some aspects, one or more other components of the apparatus 706 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modulator, a transmit MIMO processor, a transmit processor, a controller/processor, a memory, or a combination thereof, of the UE described above in connection with FIG. 2. In some aspects, the transmission component 704 may be co-located with the reception component 702 in a transceiver.

The reception component 702 may receive configuration information for a beam report, wherein the configuration information indicates whether the beam report is associated with at least one of a subband granularity or a wideband granularity, wherein the beam report is for an RSRP measurement or an SINR measurement, and the beam report is based at least in part on a CSI-RS or an SSB. The determination component 708 may determine the beam report based at least in part on the configuration information. In some aspects, the determination component 708 may include one or more antennas, a demodulator, a MIMO detector, a receive processor, a modulator, a transmit MIMO processor, a transmit processor, a controller/processor, a memory, or a combination thereof, of the UE described above in connection with FIG. 2. The transmission component 704 may transmit the beam report.

The selection component 710 may select the set of CMRs, or CMR and IMR pairs, based at least in part on one or more measurement values for a wideband. In some aspects, the selection component 710 may include one or more antennas, a demodulator, a MIMO detector, a receive processor, a modulator, a transmit MIMO processor, a transmit processor, a controller/processor, a memory, or a combination thereof, of the UE described above in connection with FIG. 2.

The selection component 710 may select the set of CMRs, or CMR and IMR pairs, based at least in part on a corresponding set of measurement values for one or more subbands. In some aspects, the selection component 710 may include one or more antennas, a demodulator, a MIMO detector, a receive processor, a modulator, a transmit MIMO processor, a transmit processor, a controller/processor, a memory, or a combination thereof, of the UE described above in connection with FIG. 2.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

Figure 8:
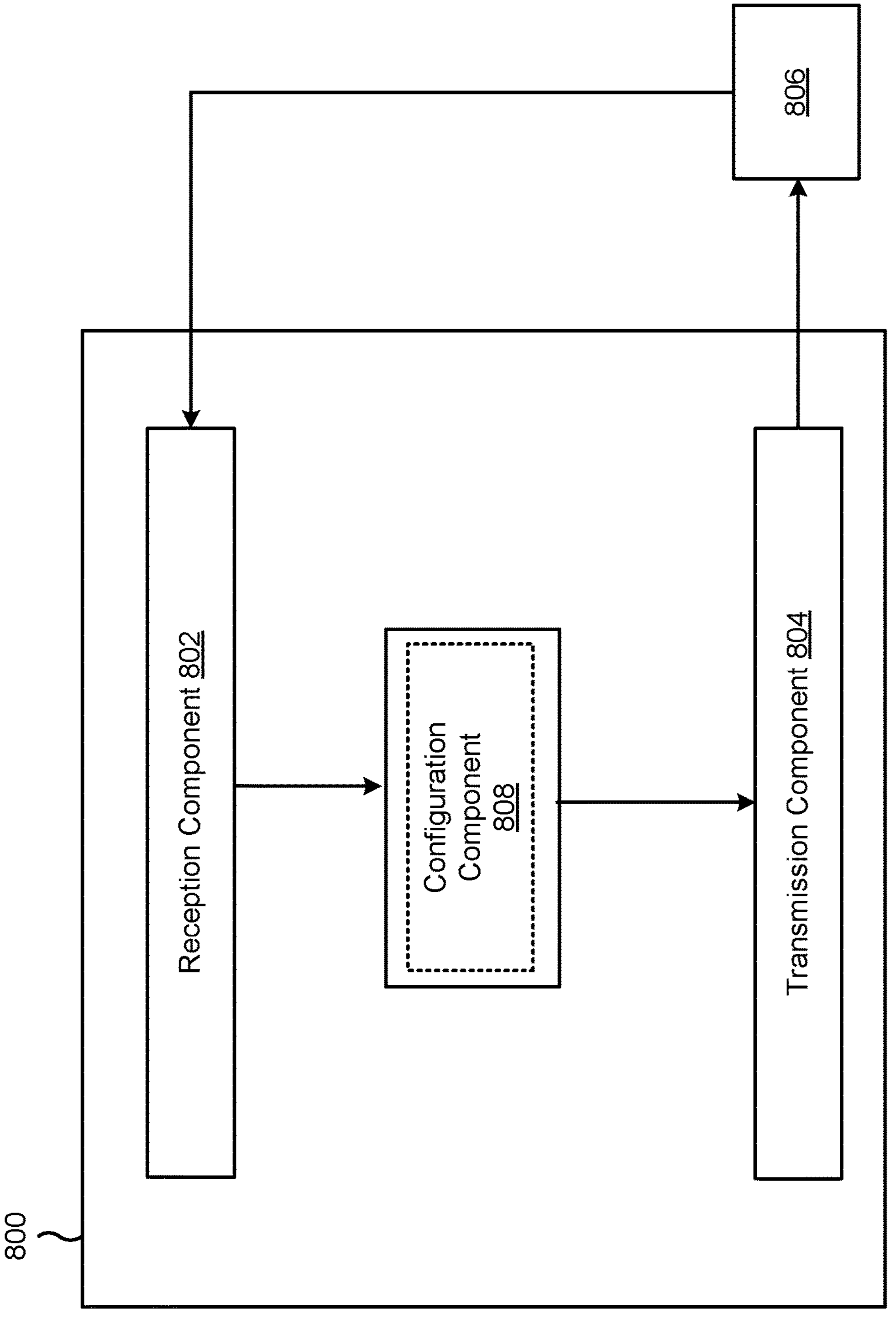
FIG. 8 is a block diagram of an example apparatus for wireless communication, in accordance with the present disclosure.

FIG. 8 is a block diagram of an example apparatus 800 for wireless communication. The apparatus 800 may be a base station, or a base station may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include a configuration component 808.

In some aspects, the apparatus 800 may be configured to perform one or more operations described herein in connection with FIGS. 3-4. Additionally, or alternatively, the apparatus 800 may be configured to perform one or more processes described herein, such as process 600 of FIG. 6. In some aspects, the apparatus 800 and/or one or more components shown in FIG. 8 may include one or more components of the base station described above in connection with FIG. 2. Additionally, or alternatively, one or more components shown in FIG. 8 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a demodulator, a MIMO detector, a receive processor, a controller/processor, a memory, or a combination thereof, of the base station described above in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the base station described above in connection with FIG. 2. In some aspects, the transmission component 804 may be co-located with the reception component 802 in a transceiver.

The transmission component 804 may transmit, to a UE, configuration information for a beam report, wherein the configuration information indicates whether the beam report is associated with at least one of a subband granularity or a wideband granularity, wherein the beam report is for an RSRP measurement or an SINR measurement, and wherein the beam report is based at least in part on a CSI-RS or an SSB. The reception component 802 may receive the beam report based at least in part on the configuration information. The configuration component 808 may determine or generate the configuration information.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

The following provides an overview of some Aspects of the present disclosure:

Aspect 1: A method of wireless communication performed by a user equipment (UE), comprising: receiving configuration information for a beam report, wherein the configuration information indicates whether the beam report is associated with at least one of a subband granularity or a wideband granularity, wherein the beam report is for a reference signal received power (RSRP) measurement or a signal to interference plus noise ratio (SINR) measurement, and wherein the beam report is based at least in part on a channel state information reference signal (CSI-RS) or a synchronization signal block (SSB); and transmitting the beam report based at least in part on the configuration information.

Aspect 2: The method of Aspect 1, wherein the beam report comprises a Layer 1 beam report.

Aspect 3: The method of any of Aspects 1-2, wherein a beam report format indicator of the configuration information indicates whether the beam report is associated with at least one of the subband granularity or the wideband granularity.

Aspect 4: The method of any of Aspects 1-3, wherein a beam report metric of the beam report indicates whether the beam report is associated with at least one of the subband granularity or the wideband granularity.

Aspect 5: The method of any of Aspects 1-4, wherein the beam report is associated with the subband granularity, and wherein a subband size for the beam report is defined as a contiguous set of physical resource blocks (PRBs).

Aspect 6: The method of Aspect 5, wherein the subband size is based at least in part on a bandwidth of a bandwidth part of the UE.

Aspect 7: The method of Aspect 6, wherein the bandwidth of the bandwidth part of the UE is associated with multiple subband sizes, and wherein the subband size for the beam report is indicated to the UE.

Aspect 8: The method of any of Aspects 1-7, wherein the beam report is associated with the subband granularity, and wherein the method further comprises: receiving information indicating a set of subbands for the beam report.

Aspect 9: The method of Aspect 8, wherein the set of subbands is indicated via a bitmap.

Aspect 10: The method of Aspect 8, wherein the information indicating the set of subbands is included in the configuration information.

Aspect 11: The method of Aspect 8, wherein a resource associated with the CSI-RS is associated with a same frequency density as each CSI-RS port per physical resource block in each subband of the set of subbands.

Aspect 12: The method of Aspect 8, wherein the beam report is based at least in part on a CSI interference measurement (CSI-IM) resource, and wherein each physical resource block in each subband of the set of subbands includes one or more CSI-IM resource elements.

Aspect 13: The method of any of Aspects 1-12, wherein the beam report indicates absolute measurement values for each subband of a set of subbands associated with the beam report.

Aspect 14: The method of any of Aspects 1-13, wherein the beam report indicates an absolute measurement value for a reference subband of a set of subbands associated with the beam report, and wherein the beam report indicates one or more differential measurement values for one or more other subbands, of the set of subbands, relative to the absolute measurement value.

Aspect 15: The method of any of Aspects 1-14, wherein the beam report indicates one or more absolute measurement values for each subband of a set of subbands associated with the beam report and an absolute measurement value for a wideband associated with the beam report.

Aspect 16: The method of any of Aspects 1-15, wherein the beam report indicates an absolute measurement value for a wideband associated with the beam report, and wherein the beam report indicates one or more differential measurement values for one or more subbands, of a set of subbands associated with the beam report, relative to the absolute measurement value.

Aspect 17: The method of any of Aspects 1-16, wherein the configuration information indicates a single channel measurement resource (CMR), or a single CMR and interference measurement resource (IMR) pair.

Aspect 18: The method of any of Aspects 1-17, wherein the configuration information indicates multiple channel measurement resource (CMR) or multiple CMR and interference measurement resource (IMR) pairs, and wherein the beam report is based at least in part on a set of CMRs or CMR and IMR pairs.

Aspect 19: The method of Aspect 18, further comprising: selecting the set of CMRs, or CMR and IMR pairs, based at least in part on one or more measurement values for a wideband.

Aspect 20: The method of Aspect 18, further comprising: selecting the set of CMRs, or CMR and IMR pairs, based at least in part on a corresponding set of measurement values for one or more subbands.

Aspect 21: The method of Aspect 18, wherein the beam report indicates an absolute measurement value for a reference subband of a set of subbands corresponding to the set of CMRs or CMR and IMR pairs, and wherein the beam report indicates one or more differential measurement values for one or more other subbands, of the set of subbands corresponding to the set of CMRs or CMR and IMR pairs, relative to the absolute measurement value.

Aspect 22: The method of Aspect 18, wherein the beam report indicates an absolute measurement value for a reference subband or wideband, of a set of subbands or wide-bands corresponding to the set of CMRs or CMR and IMR pairs, and wherein the beam report indicates one or more differential measurement values for one or more other subbands or widebands, of the set of subbands or widebands corresponding to the set of CMRs or CMR and IMR pairs, relative to the absolute measurement value.

Aspect 23: A method of wireless communication performed by a base station, comprising: transmitting, to a user equipment (UE), configuration information for a beam report, wherein the configuration information indicates whether the beam report is associated with at least one of a subband granularity or a wideband granularity, wherein the beam report is for a reference signal received power (RSRP) measurement or a signal to interference plus noise ratio (SINR) measurement, and wherein the beam report is based at least in part on a channel state information reference signal (CSI-RS) or a synchronization signal block (SSB); and receiving the beam report based at least in part on the configuration information.

Aspect 24: The method of Aspect 23, wherein the beam report comprises a Layer 1 beam report.

Aspect 25: The method of any of Aspects 23-24, wherein a beam report format indicator of the configuration information indicates whether the beam report is associated with at least one of the subband granularity or the wideband granularity.

Aspect 26: The method of any of Aspects 23-25, wherein a beam report metric of the beam report indicates whether the beam report is associated with at least one of the subband granularity or the wideband granularity.

Aspect 27: The method of any of Aspects 23-26, wherein the beam report is associated with the subband granularity, and wherein a subband size for the beam report is defined as a contiguous set of physical resource blocks (PRBs).

Aspect 28: The method of Aspect 27, wherein the subband size is based at least in part on a bandwidth of a bandwidth part of the UE.

Aspect 29: The method of Aspect 28, wherein the bandwidth of the bandwidth part of the UE is associated with multiple subband sizes, and wherein the subband size for the beam report is indicated to the UE.

Aspect 30: The method of any of Aspects 23-29, wherein the beam report is associated with the subband granularity, and wherein the method further comprises: transmitting information indicating a set of subbands for the beam report.

Aspect 31: The method of Aspect 30, wherein the set of subbands is indicated via a bitmap.

Aspect 32: The method of Aspect 30, wherein the information indicating the set of subbands is included in the configuration information.

Aspect 33: The method of Aspect 30, wherein a resource associated with the CSI-RS is associated with a same frequency density as each CSI-RS port per physical resource block in each subband of the set of subbands.

Aspect 34: The method of Aspect 30, wherein the beam report is based at least in part on a CSI interference measurement (CSI-IM) resource, and wherein each physical resource block in each subband of the set of subbands includes one or more CSI-IM resource elements.

Aspect 35: The method of any of Aspects 23-34, wherein the beam report indicates absolute measurement values for each subband of a set of subbands associated with the beam report.

Aspect 36: The method of any of Aspects 23-35, wherein the beam report indicates an absolute measurement value for a reference subband of a set of subbands associated with the beam report, and wherein the beam report indicates one or more differential measurement values for one or more other subbands, of the set of subbands, relative to the absolute measurement value.

Aspect 37: The method of any of Aspects 23-36, wherein the beam report indicates one or more absolute measurement values for each subband of a set of subbands associated with the beam report and an absolute measurement value for a wideband associated with the beam report.

Aspect 38: The method of any of Aspects 23-37, wherein the beam report indicates an absolute measurement value for a wideband associated with the beam report, and wherein the beam report indicates one or more differential measurement values for one or more subbands, of a set of subbands associated with the beam report, relative to the absolute measurement value.

Aspect 39: The method of any of Aspects 23-38, wherein the configuration information indicates a single channel measurement resource (CMR), or a single CMR and interference measurement resource (IMR) pair.

Aspect 40: The method of any of Aspects 23-39, wherein the configuration information indicates multiple channel measurement resource (CMR), or multiple CMR and interference measurement resource (IMR) pairs, and wherein the beam report is based at least in part on a set of CMRs, or CMR and IMR pairs.

Aspect 41: The method of Aspect 40, wherein the beam report indicates an absolute measurement value for a reference subband of a set of subbands corresponding to the set of CMRs, or CMR and IMR pairs, and wherein the beam report indicates one or more differential measurement values for one or more other subbands, of the set of subbands corresponding to the set of CMRs, or CMR and IMR pairs, relative to the absolute measurement value.

Aspect 42: The method of Aspect 40, wherein the beam report indicates an absolute measurement value for a reference subband or wideband, of a set of subbands or widebands corresponding to the set of CMRs or CMR and IMR pairs, and wherein the beam report indicates one or more differential measurement values for one or more other subbands or widebands, of the set of subbands or widebands corresponding to the set of CMRs, or CMR and IMR pairs, relative to the absolute measurement value.

Aspect 43: An apparatus for wireless communication at a device, comprising a processor; memory coupled with the processor; and instructions stored in the memory and executable by the processor to cause the apparatus to perform the method of one or more of Aspects 1-42.

Aspect 44: A device for wireless communication, comprising a memory and one or more processors coupled to the memory, the one or more processors configured to perform the method of one or more of Aspects 1-42.

Aspect 45: An apparatus for wireless communication, comprising at least one means for performing the method of one or more of Aspects 1-42.

Aspect 46: A non-transitory computer-readable medium storing code for wireless communication, the code comprising instructions executable by a processor to perform the method of one or more of Aspects 1-42.

Aspect 47: A non-transitory computer-readable medium storing a set of instructions for wireless communication, the set of instructions comprising one or more instructions that, when executed by one or more processors of a device, cause the device to perform the method of one or more of Aspects 1-42.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:

a memory; and one or more processors, coupled to the memory, configured to:

receive configuration information for a beam report, wherein the configuration information indicates whether the beam report is associated with at least one of a subband granularity, a wideband granularity, or a combination of subband and wideband granularity, wherein the beam report is for a reference signal received power (RSRP) measurement or a signal to interference plus noise ratio (SINR) measurement of a wideband associated with the wideband granularity and a subband associated with the subband granularity, and wherein the beam report is based at least in part on a channel state information reference signal (CSI-RS) or a synchronization signal block (SSB);

receive, separately from the configuration information, information indicating a set of subbands of the wideband for the beam report associated with a candidate beam; and transmit the beam report based at least in part on the configuration information, the beam report including an indication of an RSRP quantity for the RSRP measurement or an SINR quantity for the SINR measurement of the wideband and an indication of the RSRP quantity for the RSRP measurement or the SINR measurement of the subband.

2. The UE of claim 1, wherein the beam report comprises a Layer 1 beam report.

3. The UE of claim 1, wherein a Layer 1 beam report format indicator of the configuration information indicates whether the beam report is associated with at least one of the subband granularity, the wideband granularity, or the combination of subband and wideband granularity, and wherein a beam report metric of the beam report indicates whether the beam report is associated with at least one of the subband granularity, the wideband granularity, or the combination of subband and wideband granularity.

4. The UE of claim 1, wherein the beam report is associated with the subband granularity, and wherein a subband size for the beam report is defined as a contiguous set of physical resource blocks (PRBs).

5. The UE of claim 4, wherein the subband size is based at least in part on a bandwidth of a bandwidth part of the UE.

6. The UE of claim 5, wherein the bandwidth of the bandwidth part of the UE is associated with multiple subband sizes, and wherein the subband size for the beam report is indicated to the UE.

7. The UE of claim 1, wherein the set of subbands is indicated via a bitmap.

8. The UE of claim 1, wherein a resource associated with the CSI-RS is associated with a same frequency density as each CSI-RS port per physical resource block in each subband of the set of subbands.

9. The UE of claim 1, wherein the beam report is based at least in part on a CSI interference measurement (CSI-IM) resource, and wherein each physical resource block in each subband of the set of subbands includes one or more CSI-IM resource elements.

10. The UE of claim 1, wherein the beam report indicates absolute measurement values for each subband of a set of subbands associated with the beam report.

11. The UE of claim 1, wherein the beam report indicates an absolute measurement value for a reference subband of a set of subbands associated with the beam report, and wherein the beam report indicates one or more differential measurement values for one or more other subbands, of the set of subbands, relative to the absolute measurement value.

12. The UE of claim 1, wherein the beam report indicates one or more absolute measurement values for each subband of a set of subbands associated with the beam report and an absolute measurement value for the wideband associated with the beam report.

13. The UE of claim 1, wherein the beam report indicates an absolute measurement value for the wideband associated with the beam report, and wherein the beam report indicates one or more differential measurement values for one or more subbands, of a set of subbands associated with the beam report, relative to the absolute measurement value.

14. The UE of claim 1, wherein the configuration information indicates a single channel measurement resource (CMR), or a single CMR and interference measurement resource (IMR) pair.

15. The UE of claim 1, wherein the configuration information indicates multiple channel measurement resources (CMRs) or multiple CMR and interference measurement resource (IMR) pairs, and wherein the beam report is based at least in part on a set of CMRs or a set of CMR and IMR pairs.

16. The UE of claim 15, wherein the one or more processors are further configured to:

select the set of CMRs or the set of CMR and IMR pairs based at least in part on one or more measurement values for the wideband associated with the beam report.

17. The UE of claim 15, wherein the one or more processors are further configured to:

select the set of CMRs, or the set of CMR and IMR pairs, based at least in part on a corresponding set of measurement values for one or more subbands.

18. The UE of claim 15, wherein the beam report indicates an absolute measurement value for a reference subband or wideband, of a set of subbands or widebands corresponding to the set of CMRs or the set of CMR and IMR pairs, and wherein the beam report indicates one or more differential measurement values for one or more other subbands or widebands, of the set of subbands or widebands corresponding to the set of CMRs or the set of CMR and IMR pairs, relative to the absolute measurement value.

19. The UE of claim 1, wherein the beam report is associated with the subband granularity, and wherein the one or more processors are configured to:

receive, via radio resource control (RRC) signaling, the configuration information for the beam report; and receive, via media access control (MAC) signaling, the information indicating a set of subbands of the wideband for the beam report.

20. The UE of claim 1, wherein the beam report is associated with the subband granularity, and wherein the one or more processors are configured to:

receive, via radio resource control (RRC) signaling, the configuration information for the beam report; and receive, via downlink control information (DCI) signaling, the information indicating a set of subbands of the wideband for the beam report.

21. A base station for wireless communication, comprising:

a memory; and one or more processors, coupled to the memory, configured to:

transmit, to a user equipment (UE), configuration information for a beam report, wherein the configuration information indicates whether the beam report is associated with at least one of a subband granularity, a wideband granularity, or a combination of subband and wideband granularity, wherein the beam report is for a reference signal received power (RSRP) measurement or a signal to interference plus noise ratio (SINR) measurement of a wideband associated with the wideband granularity and a subband associated with the subband granularity, and wherein the beam report is based at least in part on a channel state information reference signal (CSI-RS) or a synchronization signal block (SSB);

transmit, separately from the configuration information, information indicating a set of subbands of the wideband for the beam report associated with a candidate beam; and receive the beam report based at least in part on the configuration information, the beam report including an indication of an RSRP quantity for the RSRP measurement or an SINR quantity for the SINR measurement of the wideband and an indication of the RSRP quantity for the RSRP measurement or the SINR quantity for the SINR measurement of the subband.

22. The base station of claim 21, wherein the beam report comprises a Layer 1 beam report.

23. The base station of claim 21, wherein a Layer 1 beam report format indicator of the configuration information indicates whether the beam report is associated with at least one of the subband granularity, the wideband granularity, or the combination of subband and wideband granularity.

24. The base station of claim 21, wherein a beam report metric of the beam report indicates whether the beam report is associated with at least one of the subband granularity or the wideband granularity.

25. A method of wireless communication performed by a user equipment (UE), comprising:

receiving configuration information for a beam report, wherein the configuration information indicates whether the beam report is associated with at least one of a subband granularity, a wideband granularity, or a combination of subband and wideband granularity, wherein the beam report is for a reference signal received power (RSRP) measurement or a signal to interference plus noise ratio (SINR) measurement of a wideband associated with the wideband granularity and a subband associated with the subband granularity, and wherein the beam report is based at least in part on a channel state information reference signal (CSI-RS) or a synchronization signal block (SSB);

receiving, separately from the configuration information, information indicating a set of subbands of the wideband for the beam report associated with a candidate beam; and transmitting the beam report based at least in part on the configuration information, the beam report including an indication of an RSRP quantity for the RSRP measurement or an SINR quantity for the SINR measurement of the wideband and an indication of the RSRP quantity for the RSRP measurement or the SINR quantity for the SINR measurement of the subband.

26. The method of claim 25, wherein the beam report comprises a Layer 1 beam report.

27. The method of claim 25, wherein a Layer 1 beam report format indicator of the configuration information indicates whether the beam report is associated with at least one of the subband granularity, the wideband granularity, or the combination of subband and wideband granularity, and wherein a beam report metric of the beam report indicates whether the beam report is associated with at least one of the subband granularity or the wideband granularity.

28. A method of wireless communication performed by a base station, comprising:

transmitting, to a user equipment (UE), configuration information for a beam report, wherein the configuration information indicates whether the beam report is associated with at least one of a subband granularity, a wideband granularity, or a combination of subband and wideband granularity, wherein the beam report is for a reference signal received power (RSRP) measurement or a signal to interference plus noise ratio (SINR) measurement of a wideband associated with the wideband granularity and a subband associated with the subband granularity, and wherein the beam report is based at least in part on a channel state information reference signal (CSI-RS) or a synchronization signal block (SSB);

transmitting, separately from the configuration information, information indicating a set of subbands of the wideband for the beam report associated with a candidate beam; and receiving the beam report based at least in part on the configuration information, the beam report including an indication of an RSRP quantity for the RSRP measurement or an SINR quantity for the SINR measurement of the wideband and an indication of the RSRP quantity for the RSRP measurement or the SINR quantity for the SINR measurement of the subband.

29. The method of claim 28, wherein the beam report comprises a Layer 1 beam report.

30. The method of claim 28, wherein a Layer 1 beam report format indicator of the configuration information indicates whether the beam report is associated with at least one of the subband granularity, the wideband granularity, or the combination of subband and wideband granularity.

* * * * *